B. ZSARNAY.
AUTOMATIC WATER DRIVE FOR TOYS AND MACHINERY.
APPLICATION FILED AUG. 25, 1920.
1,391,158.
Patented Sept. 20, 1921.
2 SHEETS—SHEET 1.
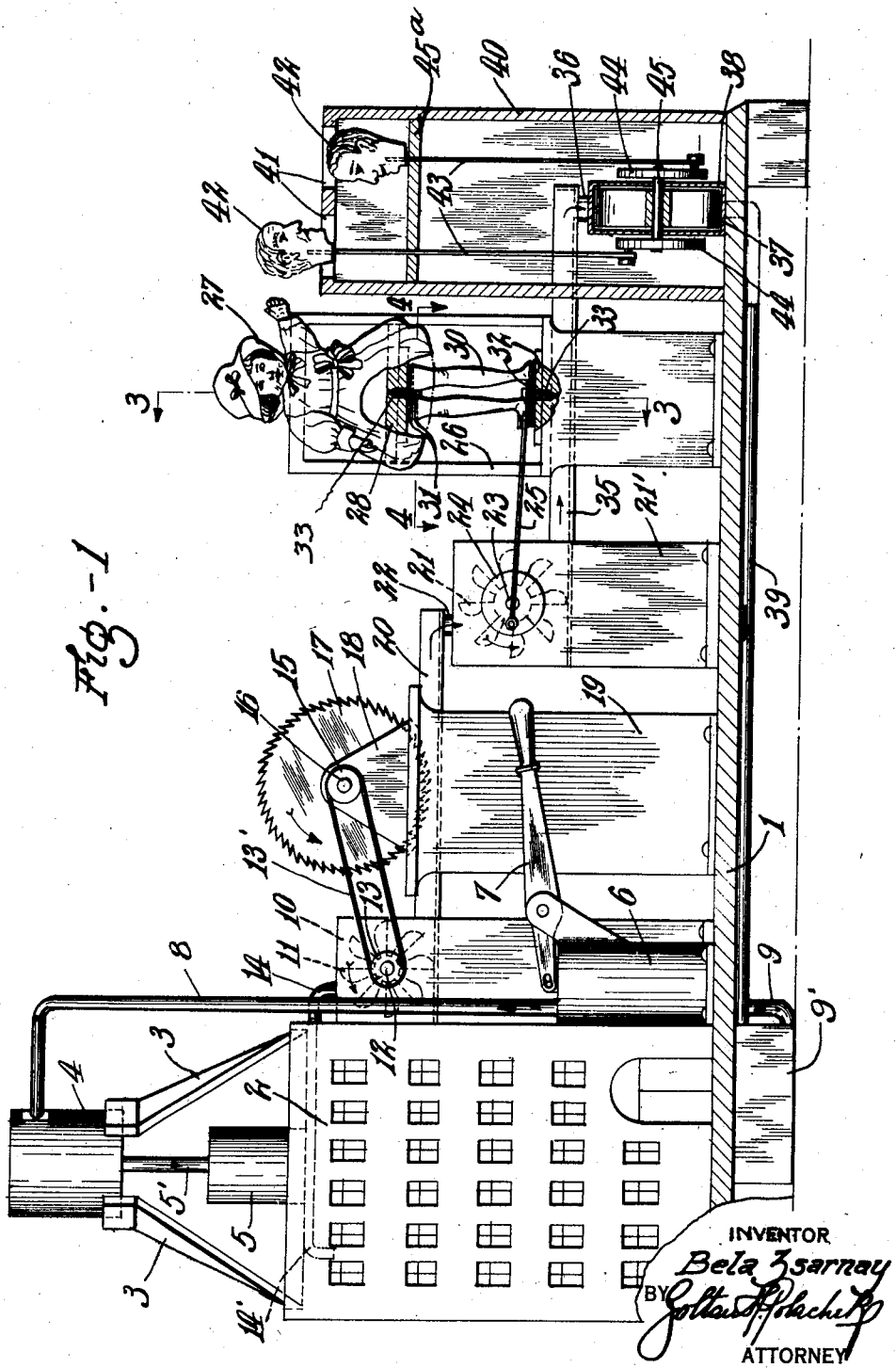
INVENTOR
Bela Zsarnay
BY
ATTORNEY B. ZSARNAY.
AUTOMATIC WATER DRIVE FOR TOYS AND MACHINERY.
APPLICATION FILED AUG. 25, 1920.
1,391,158.
Patented Sept. 20, 1921.
2 SHEETS—SHEET 2.
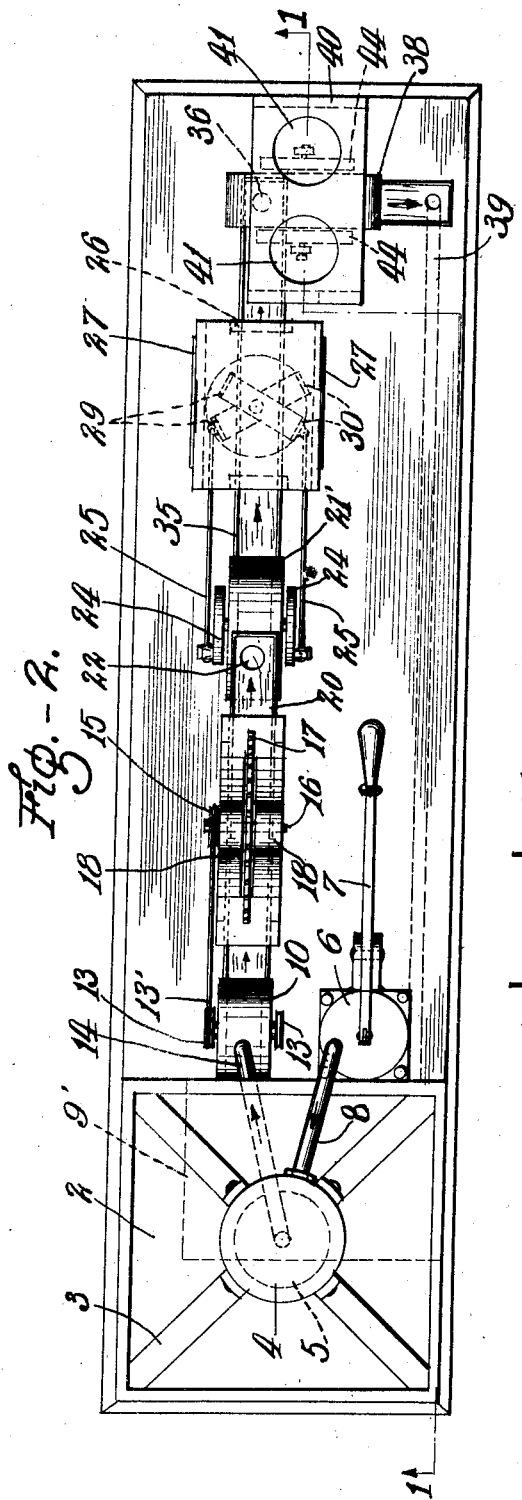
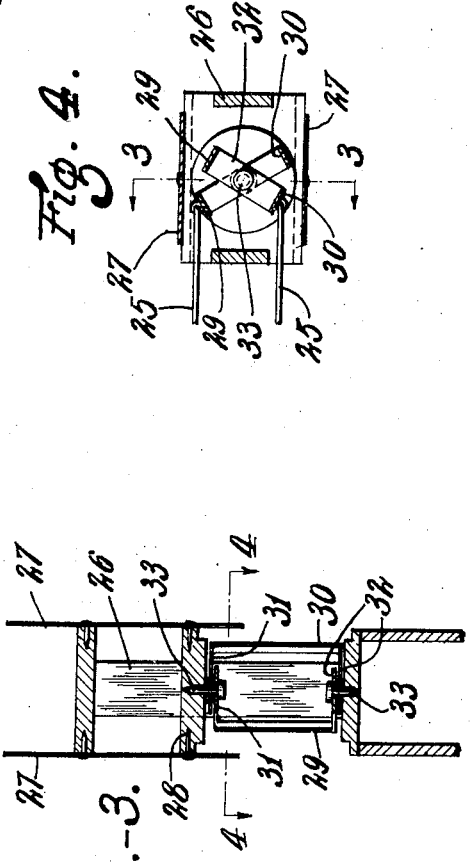
INVENTOR
Bela Zsarnay
BY
ATTORNEY

UNITED STATES PATENT OFFICE.

BÉLA ZSARNAY, OF BELLEVILLE, NEW JERSEY, ASSIGNOR OF ONE-HALF TO ABRAHAM LEWIS, OF NEWARK, NEW JERSEY.

AUTOMATIC WATER-DRIVE FOR TOYS AND MACHINERY.

1,391,158.      Specification of Letters Patent.     Patented Sept. 20, 1921.

Application filed August 25, 1920. Serial No. 405,993.

*To all whom it may concern:*

Be it known that I, BÉLA ZSARNAY, citizen of Hungary, residing at Belleville, in the county of Essex and State of New Jersey, have invented certain new and useful Improvements in Automatic Water-Drives for Toys and Machinery, of which the following is a specification.

This invention relates generally to toys, having more particular reference to a mechanical toy adapted for hydraulic operation.

The invention has for an object to provide an arrangement of parts in which a series of different devices may be operated by the action of a stream of water in succession upon a series of water wheels.

A further object relates to the provision of novel operative movements of the devices on figures of the toy.

For further comprehension of the invention, and of the objects and advantages thereof, reference will be had to the following description and accompanying drawings, and to the appended claims in which the various novel features of the invention are more particularly set forth.

Figure 1 of the drawings is a side elevation, partly in longitudinal section, of a toy constructed according to the invention.

Fig. 2 is a plan view thereof.

Fig. 3 is a detail transverse section on the line 3—3 shown in Figs. 1 and 4.

Fig. 4 is a horizontal section on the line 4—4 of Fig. 3.

Referring now to the drawings 1 indicates a base or platform upon one end of which may be a miniature house 2 above which is supported, as by the struts 3, a water tank 4. A subsidiary water tank 5 may be located on the top of the house under the tank 4 and connected to the latter by a pipe 5'. The tank 4 may be provided with any kind of well known device to prevent discharge of water therefrom until the tank has been substantially filled. Located on the platform 1 adjacent the house 2 is a pump 6 of ordinary type and operable by a handle 7. From this pump a pipe 8 leads to the tank 4, and a second pipe 9 leading from a receiving tank 9', under the platform 1, to the pump 6, Located in a suitable casing 10 beside the house 2 is an overshot water wheel 11 fixed on a shaft 12 on one end of which is a pulley 13. A pipe 14 leads from the tank 5 to the casing 10 to conduct the water upon the wheel 11. Looped over the pulley 13 is a belt 13' which is also looped over a pulley 15 on a shaft 16 on which is fixed any device which it may be desired to operate, such as the saw 17, or a dynamo or other device. The bearings 18 for the saw 17 may be supported on a suitable frame 19.

The water leaving the water wheel 11 is conducted away by a conduit 20 to a point beyond the saw 17, this conduit extending over a second water wheel 21 located in a casing 21' supported on the platform 1, a short vertical pipe 22 delivering the water from the conduit upon the water wheel 21, the head of water for wheel 21 being less than that for wheel 11. Upon the projecting ends of shaft 23 of wheel 21 are fixed a pair of crank disks 24 to which are connected the rods 25 which are adapted to give a compound doll-like figure the appearance of dancing.

This figure may comprise a rectangular frame 26 having a pair of side pieces 27 secured to opposite sides of the upper part thereof, these side pieces being suitably fashioned to represent the upper parts of dolls. Extending across the frame 26 is a horizontal bar 28 which is preferably concealed by the skirt-like lower ends of the side pieces 27 and which serves as the support for the legs of the figure, there being a pair of legs for each of the side pieces. These legs are indicated at 29 and 30 respectively and are secured at upper and lower ends to cross pieces 31 and 32. The cross pieces at corresponding ends cross each other as shown in Fig. 4 and are suitably pivoted as indicated at 33 in the bar 28 and the base of the frame 26.

One leg of each pair has the end of one of the rods 25 secured thereto and it will be apparent that when the disks 24 are rotated an oscillating movement will be imparted to the legs.

The water discharged from wheel 21 is carried by a conduit 35 to a point beyond the figure just described and is delivered by a short vertical pipe 36 upon a third water wheel 37 in a casing 38 supported on the platform 1, the head of water for this wheel being preferably less than the head of water for the wheel 21.

From this casing 38 a return pipe 39 leads back to the receiving tank 9'. The casing 38 is preferably inclosed in a box 40 having a pair of apertures 41 in its top, these apertures being adapted to accommodate a pair of figure elements such as the heads 42 fixed on the upper ends of rods 43 whose lower ends are connected to crank disks 44 on the ends of the shaft 45 of the water wheel 37. A horizontal member 45ª near the top of the box 40 serves as a guide for the upper ends of the rods 43. It will be apparent that as wheel 37 revolves the heads 42 will alternately rise and descend in the apertures.

The manner of use and operation of my improved toy will be apparent from the above description, the water being pumped by hand into the top tank 4 and flowing in succession upon the different water wheels, causing the latter to revolve and impart movement to the figures or devices connected therewith.

If desired I may provide pipe 14 with a branch 14' leading into the house 2 to furnish the water to faucets, baths or other fixtures contained therein.

Having thus described my invention what I claim as new and desire to protect by Letters Patent of the United States is as follows:

1. In a toy, a water wheel, a compound doll figure comprising oppositely facing elements, a pair of legs for each element, and means connecting the said legs to the said water wheel for oscillating the legs of each element in unison.

2. In a toy, a water wheel, a compound doll figure comprising oppositely facing elements, a pair of legs for each element, centrally pivoted cross bars rigidly connecting the upper and lower ends of the legs of one pair with those of the other pair, a pair of crank members located one on each side of said water wheel and operated thereby, and connecting rods connected at opposite ends to the respective crank members and legs.

3. In a toy, a water wheel, a compound doll figure, a compound doll figure comprising oppositely facing elements, a pair of legs for each element, and means connecting the said legs to the said water wheel for oscillating the legs of each element.

In testimony whereof I have affixed my signature.

BÉLA ZSARNAY.